US012567143B2

(12) United States Patent
Chung et al.

(10) Patent No.: US 12,567,143 B2
(45) Date of Patent: Mar. 3, 2026

(54) ANALYZING TISSUE SUFFICIENCY IN BIOPSY

(71) Applicants:INDUSTRY-ACADEMIC COOPERATION FOUNDATION, YONSEI UNIVERSITY, Seoul (KR); THE GENERAL HOSPITAL CORPORATION, Boston, MA (US)

(72) Inventors: Moon Jae Chung, Seoul (KR); Hyungsoon Im, Peabody, MA (US)

(73) Assignees: The General Hospital Corporation, Boston, MA (US); Industry-Academic Cooperation Foundation, Yonsei University, Seoul (KR)

( * ) Notice: Subject to any disclaimer, the term of this patent is extended or adjusted under 35 U.S.C. 154(b) by 400 days.

(21) Appl. No.: 18/167,425

(22) Filed: Feb. 10, 2023

(65) Prior Publication Data

US 2023/0326018 A1 Oct. 12, 2023

(30) Foreign Application Priority Data

Feb. 11, 2022 (KR) ........................ 10-2022-0018048

(51) Int. Cl.
*G06T 7/00* (2017.01)
(52) U.S. Cl.
CPC .. *G06T 7/0012* (2013.01); *G06T 2207/20081* (2013.01); *G06T 2207/20084* (2013.01); *G06T 2207/30024* (2013.01); *G06T 2207/30242* (2013.01)
(58) Field of Classification Search
CPC ......... G06T 7/0012; G06T 2207/30024; G06T 2207/30242; G06T 2207/30096; G06T 2207/20081; G06T 2207/20084; A61B 10/00; A61B 10/02
See application file for complete search history.

(56) References Cited

U.S. PATENT DOCUMENTS

| | | | |
|---|---|---|---|
| 10,025,271 B2 | 7/2018 | Mathuis et al. | |
| 2009/0162853 A1 | 6/2009 | Clark et al. | |
| 2019/0223728 A1 | 7/2019 | Heidari et al. | |
| 2021/0191094 A1* | 6/2021 | Ye .......................... | G02B 21/26 |
| 2022/0012879 A1* | 1/2022 | De Poly ............. | G01B 9/02091 |
| 2022/0276268 A1* | 9/2022 | Mendoza ......... | G01N 35/00029 |
| 2024/0192120 A1* | 6/2024 | Freudiger ............ | G01N 1/4077 |

FOREIGN PATENT DOCUMENTS

| | | |
|---|---|---|
| CN | 111489833 | 8/2020 |
| WO | WO 2010/102632 | 9/2010 |
| WO | WO 2018/140014 | 8/2018 |

OTHER PUBLICATIONS

International Preliminary Report on Patentability in International Appln. No. PCT/US2021/046174, mailed Feb. 23, 2023, 7 pages.
International Search Report & Written Opinion in International Appln. No. PCT/US2021/046174, mailed Nov. 24, 2021, 12 pages.

* cited by examiner

*Primary Examiner* — Kent Yip
(74) *Attorney, Agent, or Firm* — Fish & Richardson P.C.

(57) ABSTRACT

Disclosed is a method for examining cells including: acquiring image data of cells acquired from a region suspected to be a cancer lesion; analyzing the image data; determining whether an amount of the cells is sufficient based on the analyzed result; and determining whether cancer-probable cells are included in the cells based on the analyzed result and the determined result; wherein the cells are acquired through Fine Needle Aspiration (FNA).

20 Claims, 4 Drawing Sheets

FIG. 2

```
          ┌─────────────┐
          │    Start     │
          └──────┬──────┘
                 │
                 ▼
 ┌─────────────────────────────────┐
 │     Extract tissues by FNA       │ ──── S100
 └─────────────────┬───────────────┘
                   │
                   ▼
 ┌─────────────────────────────────┐
 │ Provide tissues to tissue analysis device │ ──── S200
 └─────────────────┬───────────────┘
                   │
                   ▼
 ┌─────────────────────────────────┐
 │     Perform suitability test     │ ──── S300
 └─────────────────┬───────────────┘
                   │
                   ▼
          ┌─────────────┐
          │     End      │
          └─────────────┘
```

ANALYZING TISSUE SUFFICIENCY IN BIOPSY

CROSS-REFERENCE TO RELATED APPLICATION

A claim for priority under 35 U.S.C. § 119 is made to Korean Patent Application No. 10-2022-0018048 filed on Feb. 11, 2022 in the Korean Intellectual Property Office, the entire contents of which are hereby incorporated by reference.

BACKGROUND

1. Technical Field

The present disclosure relates to a method for examining cell and a device thereof.

2. Description of Related Art

A biopsy is a method of examining a patient's condition by examining tissue. There are provided a fine needle aspiration (FNA) method and a non-FNA method as methods for extracting tissue. The non-FNA method can sufficiently acquire tissue or allow a tissue extraction process to be easily repeated. However, the FNA method, used to extract tissue during the endoscopic procedure, has the inconvenience of requiring an endoscopy to be performed again, in a case in which the amount of tissue is insufficient.

In order to determine whether the amount of tissue acquired through the FNA method is sufficient for a biopsy, a clinical pathologist should go through the ROSE (Rapid On-Site Cytological Evaluation) process to determine whether the amount of tissue is sufficient for examination. The reality is that it is difficult for a clinical pathologist to always be present in the laboratory. Accordingly, there is an inconvenience in that after a few days have elapsed after the endoscopic procedure, the clinical pathologist determines whether the amount of tissue is sufficient for examination, and acquires tissue again through an endoscopic procedure in a case in which the amount is insufficient.

Accordingly, there is a need for a device and a method capable of determining in real time whether the amount of tissue acquired by FNA is sufficient for performing a biopsy.

SUMMARY

An object to be solved by the present disclosure is to provide a method for examining cell and a device thereof, capable of determining in real time whether the amount of tissue acquired by FNA is sufficient for performing a biopsy.

The problem to be solved by the present disclosure is to provide a method for examining cell and a device thereof, capable of determining, through deep learning technology, whether the amount of tissue acquired by FNA is sufficient for performing a biopsy.

The problem to be solved by the present disclosure is to provide a method for examining cell and a device thereof, capable of examining the tissue acquired by FNA through deep learning technology.

To accomplish the above-mentioned objects, according to an aspect of the present disclosure, there is provided a method for examining cells performed by a computer, the method comprising: acquiring image data of cells acquired from a region suspected to be a cancer lesion; analyzing the image data: determining whether an amount of the cells is sufficient based on the analyzed result; and determining whether cancer-probable cells are included in the cells based on the analyzed result and the determined result, wherein the cells are acquired through Fine Needle Aspiration (FNA).

According to an aspect of the present disclosure, there is provided a device for examining cells comprising: an acquisition unit for acquiring image data of cells acquired from a region suspected to be a cancer lesion: an analysis unit for analyzing the image data; and a control unit for determining whether an amount of the cells is sufficient, based on the analyzed result, and determining whether cancer-probable cells are included in the cells based on the analyzed result and the determined result, wherein the cells are acquired through Fine Needle Aspiration (FNA).

Besides the above, a computer program stored in a computer readable recording medium for embodying the present disclosure may be additionally provided.

Besides the above, a computer readable recording medium to record computer programs for executing the method may be additionally provided.

BRIEF DESCRIPTION OF THE DRAWINGS

FIG. 2 is a flow chart schematically illustrating a biopsy method according to an embodiment of the present disclosure.

DETAILED DESCRIPTION

Figure 1:
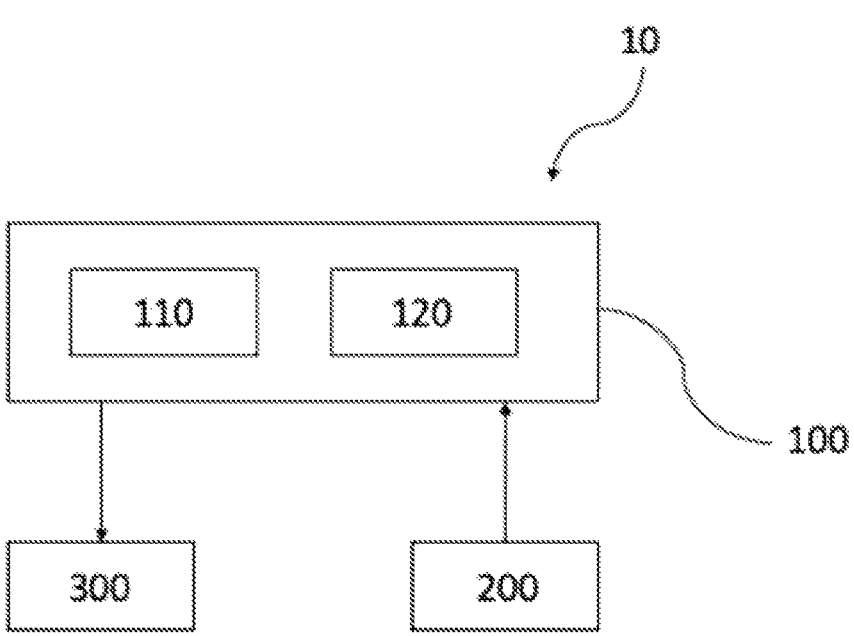
FIG. 1 is a block diagram schematically illustrating a biopsy device according to an embodiment of the present disclosure.

Advantages and features of the present disclosure and methods accomplishing the advantages and features will become apparent from the following detailed description of exemplary embodiments with reference to the accompanying drawings. However, the present disclosure is not limited to exemplary embodiment disclosed herein but will be implemented in various forms. The exemplary embodiments are provided so that the present disclosure is completely disclosed, and a person of ordinary skilled in the art can fully understand the scope of the present disclosure. Therefore, the present disclosure will be defined only by the scope of the appended claims.

Terms used in the specification are used to describe specific embodiments of the present disclosure and are not intended to limit the scope of the present disclosure. In the specification, the terms of a singular form may include plural forms unless otherwise specified. It should be also understood that the terms of 'include' or 'have' in the specification are used to mean that there is no intent to exclude existence or addition of other components besides components described in the specification. In the detailed description, the same reference numbers of the drawings refer to the same or equivalent parts of the present disclosure, and the term "and/or" is understood to include a combination of one or more of components described above. It will be understood that terms, such as "first" or "second" may be used in the specification to describe various components but are not restricted to the above terms. The terms may be used to discriminate one component from another component.

Therefore, of course, the first component may be named as the second component within the scope of the present disclosure.

In this specification, 'device' includes all kinds of various devices capable of providing results to users by performing calculation processing. For example, the device may be in the form of a computer and a mobile terminal. The computer may be in the form of a server receiving a request from a client and processing information. Additionally, the computer may correspond to a sequencing device which performs sequencing. The mobile terminal may include a mobile phone, a smartphone, a personal digital assistant (PDA), a portable multimedia player (PMP), a navigation device, a notebook PC, a slate PC, a tablet PC, an ultrabook, a wearable device (e.g., a watch type terminal (smartwatch), a glasses type terminal (smartglasses), a head mounted display (HMD)), and the like.

In this specification, a 'computer' includes all kinds of devices capable of visually presenting results to users by performing calculation processing. For example, the computer may include a desktop PC, a notebook, a smartphone, a tablet PC, a cellular phone, a personal communication service (PCS) phone, a mobile terminal of synchronous/ asynchronous international mobile telecommunication-2000 (IMT-2000), a palm personal computer (Palm PC), a personal digital assistant (PDA), and the like. In addition, the computer may also correspond to medical equipment for acquiring or observing medical images. Furthermore, the computer may correspond to a server computer connected to various client computers.

Unless otherwise defined, all terms (including technical and scientific terms) used herein have the same meaning as commonly understood by those skilled in the technical field to which the present disclosure pertains. It will be further understood that terms, such as those defined in commonly used dictionaries, should not be interpreted in an idealized or overly formal sense unless expressly so defined herein.

Hereinafter, preferred embodiments of the present disclosure will be described in detail with reference to the accompanying drawings.

FIG. 1 is a block diagram schematically illustrating a biopsy device according to an embodiment of the present disclosure.

Referring to FIG. 1, a biopsy device 10 according to an embodiment of the present disclosure may include an analysis server 100, a tissue analysis device 200, and an output device 300.

The biopsy device 10 according to an embodiment of the present disclosure determines whether the amount of tissue extracted by fine needle aspiration (FNA) is sufficient to perform a biopsy via a first deep learning model (Deep Neural Network: DNN) 110.

The tissue extracted by fine needle aspiration is provided to a tissue analysis device. The tissue may be provided without treatment, or may be provided after smearing and H&E (hematoxylin & eosin) staining.

Smearing means observing cells in a tissue using a microscope. H&E staining means staining the nucleus with hematoxylin, which is a basic dye, and staining the rest with eosin, which is an acidic dye.

In an embodiment, the tissue extracted by fine needle aspiration may be captured by an imaging device or the like and provided to the tissue analysis device 200 in the form of image data.

The biopsy device 10 according to an embodiment of the present disclosure may perform a suitability test on whether tissue is suitable for performing a biopsy using the first deep learning model 110 by one or more computers. For example, the biopsy device 10 according to an embodiment of the present disclosure may examine whether the amount of tissue is suitable for performing a biopsy using the first deep learning model 110 by one or more computers.

Hereinafter, the first deep learning model 110 will be described.

The analysis server 100 is composed of one or more computers to form the first deep learning model 110 and serves to determine whether the amount of tissue extracted by fine needle suction is sufficient to perform a biopsy.

The first deep learning model 110 according to embodiments of the present disclosure means a system or network that builds one or more layers in one or more computers and performs determination based on a plurality of data. For example, the first deep learning model 110 is a set of layers including a convolutional pooling layer, a locally-connected layer, and a fully-connected layer. The convolutional pooling layer or the local access layer may be configured to extract features within an image. The fully connected layer may determine a correlation between the features of the image. In some embodiments, the overall structure of the first deep learning model 110 may be formed in a form in which the local access layer is connected to the convolution pooling layer, and the fully connected layer is connected to the local access layer. The first deep learning model 110 may include various criteria (i.e., parameters), and may add new criteria (i.e., parameters) through an input image analysis. The parameters may include, for example, cellularity, adequacy of specimen, amount of blood, and diagnosis.

For instance, the cytoplasm may be determined by the number of cells per slide. For example, if the number of cells per slide is less than 100, it may be determined to be unsuitable, if the number of cells per slide is greater than or equal to 100 and less than 1000, it may be determined to be good, and if the number of cells per slide is greater than 1000, it may be determined to be acceptable. For example, the cytoplasm can be learned while controlling the mixing ratio of the normal pancreatic cell line and the pancreatic cancer cell line. Alternatively, the cytoplasm can be learned while controlling the number of cells to be smeared among the cells arranged on the slide.

The suitability of a sample may be determined, for example, as insufficient, suitable, or the like. For example, the suitability of the sample can be learned while controlling the mixing ratio of the normal pancreatic cell line and the pancreatic cancer cell line. Alternatively, the suitability of the sample can be learned while controlling the number of cells to be smeared among the cells arranged on the slide.

The blood volume may be determined, for example, as insufficient, good, or the like. For example, the blood volume can be learned with the number of red blood cells.

Diagnosis may be determined as, for example, benign, atypical, suspicious for malignancy, malignancy, or inadequate for reporting. Diagnosis can be learned, for example, by labeling lesional portions and normal portions of tissue.

The first deep learning model 110 according to embodiments of the present disclosure is a structure called a convolutional neural network suitable for image analysis, in which a feature extraction layer learning a feature having the greatest discriminative power from given image data by itself and a prediction layer learning a prediction model to produce the highest prediction performance based on extracted features are pooled.

The feature extraction layer may be configured into a structure which alternately repeats a convolution layer applying a plurality of filters to each region of an image to create a feature map and a pooling layer spatially pooling the feature map to extract invariant to changes in position or rotation several times. Accordingly, the feature extraction layer can extract features of various levels ranging from low-level features, such as points, lines, and planes, to complex and meaningful high-level features.

The convolutional layer takes a nonlinear activation function on the inner product of the filter and the local receptive field for each patch of the input image to acquire a feature map. Compared to other network structures, the CNN is characterized by using filters having sparse connectivity and shared weights. This connection structure reduces the number of parameters to be learned and makes learning through the backpropagation algorithm efficient, resulting in improved prediction performance.

The pooling layer or sub-sampling layer creates a new feature map by utilizing local information of the feature map acquired from the previous convolutional layer. In general, the feature map newly created by the pooling layer is reduced to a smaller size than the original feature map. As representative pooling methods, there are max pooling to select the maximum value of the corresponding area in the feature map and average pooling to acquire an average value of the corresponding area in the feature map. In general, the feature map of the pooling layer may be less affected by the position of an arbitrary structure or pattern existing in the input image than the feature map of the previous layer. That is, the pooling layer can extract features that are more robust to regional changes such as noise or distortion in the input image or the previous feature map, and these features can play an important role in classification performance. Another role of the pooling layer is to reflect the features of a wider region as going up to upper learning layers in the deep structure. While feature extraction layers are built up, feature generation which reflects local features to lower layers and reflects features of the entire abstract image to upper layers may be generated.

As described above, the features finally extracted through repetition of the convolutional layer and the pooling layer may be used for classification model learning and prediction by combining classification models such as multi-layer perception (MLP) or support vector machine (SVM) in the form of a fully-connected layer.

However, the structure of the first deep learning model 110 according to embodiments of the present disclosure is not limited thereto, and may be formed of neural networks having various structures.

A client may include at least one of the tissue analysis device 200 receiving tissue and the output device 300. The tissue analysis device 200 and the output device 300 may be implemented as one device or may be implemented as separate devices.

The tissue analysis device 200 may be a device that receives tissue extracted by fine needle aspiration and transmits tissue amount data to the analysis server 100.

The output device 300 may receive the tissue amount determination result of the analysis server 100 and provide the determination result to a user in various ways. For example, the output device 300 may include a display unit to visually display and provide the tissue amount determination result to the user. In addition, in a case in which a determination result that the amount of tissue is insufficient, the output device 300 may generate vibration to notify the user that the amount of tissue is insufficient. However, the method that the output device 300 provides the tissue amount determination result to the user is not limited thereto, and various output methods that can be provided to the user, such as sound output, may be utilized. Also, the output device 300 according to an embodiment of the present disclosure may include a mobile terminal.

The biopsy device 10 according to an embodiment of the present disclosure may analyze the tissue extracted by fine needle aspiration using a second deep learning model 120 by one or more computers.

Hereinafter, the second deep learning model 120 will be described. Hereinafter, the difference between the second deep learning model 120 and the first deep learning model 110 will be mainly explained, and parts not explained are the same as those described in the first deep learning model 110.

The analysis server 100 is composed of one or more computers to form the second deep learning model 120 and serves to analyze whether the tissue extracted by fine needle suction is normal. The analysis server of the second deep learning model 120 and the analysis server of the first deep learning model 110 may be implemented as one server or may be implemented as separate servers.

The second deep learning model 120 according to embodiments of the present disclosure refers to a system or network which builds one or more layers in one or more computers to make a decision based on a plurality of data. For example, the first deep learning model may be implemented as a set of layers including a convolutional pooling layer, a locally-connected layer, and a fully-connected layer.

The second deep learning model 120 may include various criteria (i.e., parameters), and may add new criteria (i.e., parameters) through an input image analysis.

For example, the second deep learning model 120 divides parameters into the normal pancreatic cell line (HPDE6c6) and the pancreatic cancer cell line (Capan-1, Panc-1, MIA-PaCa2, HPAC cell line), to determine whether aspiration samples extracted from normal tissue are abnormal or not.

A client may include the tissue analysis device 200 receiving tissue or the output device 300. The tissue analysis device 200 and the output device 300 may be implemented as one device or may be implemented as separate devices.

The tissue analysis device 200 may be a device that receives tissue extracted by fine needle aspiration and transmits tissue amount data to the analysis server 100. One or more tissue analysis devices 200 may be provided.

The output device 300 may receive the tissue amount determination result of the analysis server 100 and provide the determination result to a user in various ways. The output device of the second deep learning model 120 and the output device of the first deep learning model 110 may be implemented as one device or may be implemented as separate devices.

One or more output devices 300 may be provided.

Hereinafter, a biopsy method according to an embodiment of the present disclosure will be described. Hereinafter, differences from the biopsy device according to the aforementioned embodiment of the present disclosure will be described in detail, and undescribed parts may be the same as those of the biopsy device.

Figure 2:
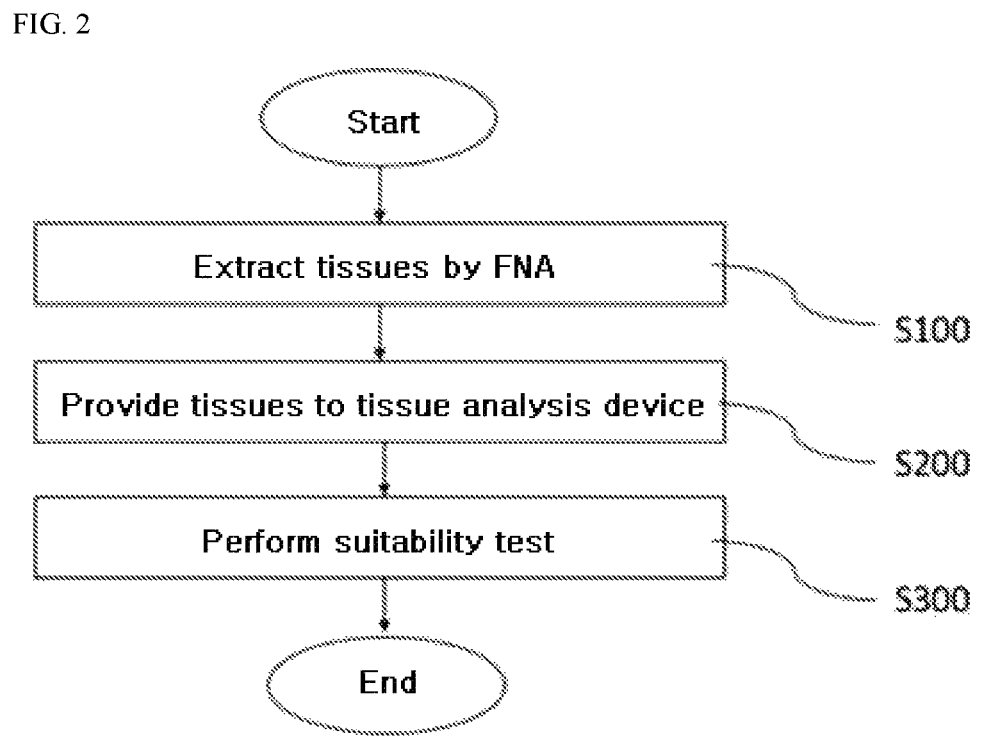

FIG. 2 is a flow chart schematically illustrating a biopsy method according to an embodiment of the present disclosure.

Referring to FIGS. 1 and 2, the biopsy method according to an embodiment of the present disclosure includes a tissue extraction step (S100), a tissue providing step (S200), and a suitability test step (S300).

Tissue is extracted by fine needle aspiration (FNA) (S100). Fine needle aspiration can be performed, for example, with an injection needle. Fine needle aspiration may be performed at an affected area of a patient.

The extracted tissue is provided to the tissue analysis device 200. The tissue may be provided to the tissue analysis device 200 without treatment, or may be provided after smearing and H&E (hematoxylin & eosin) staining. Smearing and H&E (hematoxylin & eosin) staining may be performed on the tissue after the tissue is provided to the tissue analysis device 200.

In an embodiment, the tissue extracted by fine needle aspiration may be captured by an imaging device or the like and provided to the tissue analysis device 200 in the form of image data.

A suitability test is performed to determine whether tissue is suitable for performing a biopsy using the first deep learning model 110 by one or more computers (S300).

In an embodiment, the suitability test step (S300) includes receiving tissue amount data corresponding to the amount of tissue acquired by the tissue analysis device 200, and providing a tissue amount state analyzed by the analysis server 100 to the output device 300. The output device 300 and the tissue analysis device 200 may be implemented as one device or may be implemented as separate devices.

For example, in a case in which it is recognized that the amount of tissue extracted to perform a biopsy is insufficient, a notification may be transmitted to the output device 300. The notification may be provided in various forms that can be recognized by the user, for example, sight, hearing, touch, and the like.

In an embodiment, the suitability test step (S300) may further include accumulating tissue amount data of the tissue provided from one or more tissue analysis devices to generate learning tissue amount data. Through the analysis of the learning tissue amount data, it is possible to calculate the minimum amount of tissue required for a biopsy. It may be determined whether the amount of tissue provided to the tissue analysis device 200 is greater than or equal to the minimum amount of tissue required for a biopsy. If it is less than the minimum amount, a notification may be transmitted to the output device 300.

In a case in which it is determined by the first deep learning model 110 that the amount of tissue provided to the tissue analysis device 200 is less than the minimum amount of tissue required for a biopsy, it is necessary to extract more tissue by fine needle aspiration.

The biopsy method according to an embodiment of the present disclosure may further include examining the tissue using the second deep learning model 120 by one or more computers. For example, in a case in which it is determined by the first deep learning model 110 that the amount of tissue provided to the tissue analysis device 200 is greater than or equal to the minimum amount of tissue required for a biopsy, the tissue can be examined using the second deep learning model.

In examining the tissue, the second deep learning model 120 may recognize an abnormality in the tissue and transmit a notification to the output device. Whether or not the tissue is abnormal can be determined by the parameters of the first deep learning model 110 and the second deep learning model 120 mentioned above.

In an embodiment, the examined tissue may include accumulating tissue data corresponding to the tissue provided from one or more tissue analysis devices 200 to generate learning tissue data. Normal tissue data is calculated through analysis of learning tissue data. It may be determined whether the tissue data exceeds a specific range formed based on the normal tissue data.

In an embodiment, the examined tissue may include accumulating tissue data corresponding to the tissue provided from one or more tissue analysis devices 200 to generate learning tissue data. It is possible to extract information about abnormal features of the tissue from the learning tissue data.

In an embodiment, the examining tissue may include matching and accumulating specific situation data to abnormal feature information. The abnormal feature information may mean, for example, a value that falls short of a normal range based on cellularity, adequacy of specimen, amount of blood, and the like. It is possible to recognize specific abnormal feature information within the tissue data. Situation data corresponding to the recognized abnormal characteristic information may be transmitted to the client.

Hereinafter, a cell examination method using a cell examination device will be described with reference to FIGS. 3 and 4.

Figure 3:
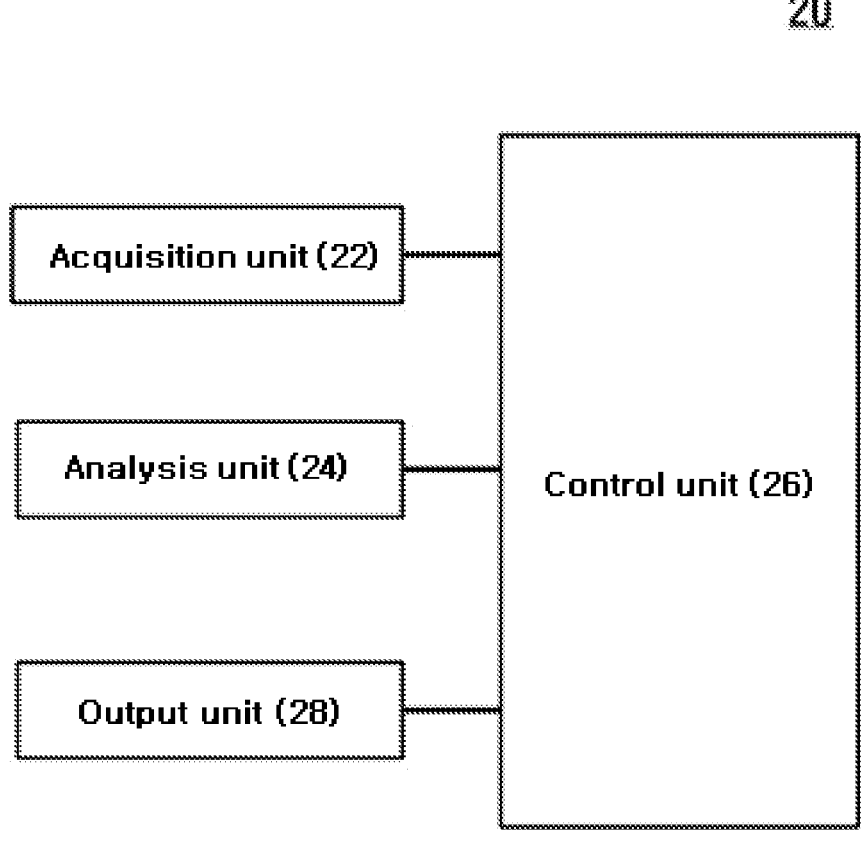
FIG. 3 is a schematic block diagram of a cell examination device according to an embodiment of the present disclosure.

FIG. 3 is a schematic block diagram of a cell examination device according to an embodiment of the present disclosure.

Figure 4:
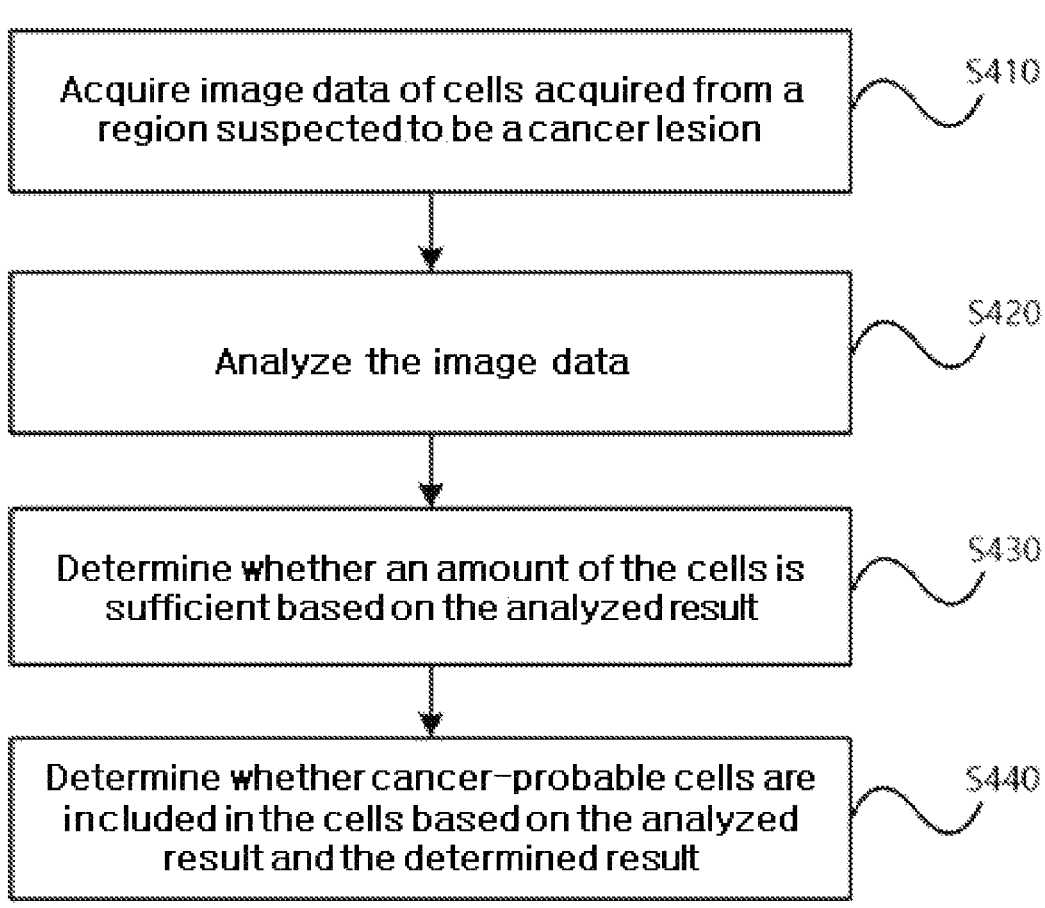
FIG. 4 is a flowchart schematically illustrating a cell examination method according to an embodiment of the present disclosure.

FIG. 4 is a flow chart schematically illustrating a cell examination method according to an embodiment of the present disclosure.

Referring to FIG. 3, a cell examination device 20 may include an acquisition unit 22, an analysis unit 24, a control unit 26, and an output unit 28. However, in some embodiments, the cell examination device 20 may include fewer or more components than those shown in FIG. 3.

Here, the cell examination device 20 may be the biopsy device 10 described with reference to FIG. 1, and the analysis unit 24, the control unit 26, and the output unit 28 may be the tissue analysis device 200, the analysis server 100, and the output device 300, respectively. That is, the analysis unit 24 may perform the function of the above-described tissue analysis device 200, the control unit 26 may perform the function of the above-described analysis server 100, and the output unit 28 may perform the function of the above-described output device 300.

Referring to FIG. 4, the acquisition unit 22 may acquire image data of cells acquired from a region suspected to be a cancer lesion (S410).

Here, cells may be acquired from a body region suspected to be a cancer lesion through fine needle aspiration (FNA).

According to an embodiment, in a case in which the acquisition unit 22 is a camera, the acquisition unit 22 may acquire image data by photographing the acquired cells.

According to an embodiment, the acquisition unit 22 may acquire image data of cells from a separate photographing device.

The analysis unit 24 may analyze the image data (S420). Even though cells are acquired from the body region suspected to be a cancer lesion through fine needle aspiration (FNA), since the corresponding region is not filled with cancer cells, cancer cells may be not captured very well. Accordingly, the image data is analyzed based on D-Rose in order to accurately determine whether the acquired cells contain cancer cells rather than normal cells. However, the present disclosure is not limited thereto, and various data analysis methods may be applied.

In step S420, the analyzer 24 may analyze the amount and type of cells. Through this analysis, the analyzer 24 can identify the number of cells with nuclei included in the image data and the types of each cell, and generate data on the number and types of the identified cells.

Based on the analyzed result, the controller 26 may determine whether the amount of the cells is sufficient (S430).

In order to reliably confirm whether cancer cells are included in the region suspected to be a cancer lesion, the amount of the acquired cells must be sufficient.

The controller 26 may calculate the number of cells with nuclei, excluding red blood cells, based on the data generated in step S420. When the number is greater than or equal to a predetermined reference number, it may be determined that the amount of cells is sufficient.

In this instance, the cells may include at least one of cancer-probable cells, inflammatory pancreatic parenchymal cells, normal gastric cells, and normal duodenal cells. When calculating the number, the controller 26 may calculate not only the number of cancer-probable cells but also the number of all cells with nuclei included in the image data.

Based on the analyzed result and the determined result, the controller 26 may determine whether or not cancer-probable cells are included in the cells (S440).

In a case in which it is determined that the amount of the cells is sufficient, the controller 26 may determine that the cells contain the cancer-probable cells, if there is at least one cancer-probable cell in the cells.

That is, in step S430, since only the number of cells was considered regardless of the type of cells, in step S440, it is necessary to determine whether there are cancer-probable cells among the corresponding number of cells.

Even if it is determined that there are cancer-probable cells, it is not certain that the corresponding cancer-probable cells are real cancer cells. Therefore, in a case in which it is determined that cell acquisition through D-Rose was successful, it is possible to determine whether the corresponding cancer-probable cells are genuine through cell examination.

Meanwhile, in a case in which it is determined that the amount of cells is not sufficient in step S430, the output unit 28 may output the determined result.

The output unit 28 may output a message that the amount of the acquired cells is not sufficient and a message about re-acquisition of cells. Accordingly, cells may be reacquired in the region suspected to be a cancer lesion.

In addition, in step S440, in a case in which it is determined that cancer-probable cells are not included in the cells, the output unit 28 may output the determined result.

The output unit 28 may output a message that cancer-probable cells are not included in the cells and a message about re-acquisition of cells. Accordingly, cells may be reacquired in the region suspected to be a cancer lesion.

In this instance, the controller 26 may determine that there are no cancer cells in the region suspected to be a cancer lesion if the number of reacquisitions of cells exceeds a preset number of times for the reason of not including the cancer-probable cells.

The cell examination method according to an embodiment of the present disclosure may be implemented as a program (or application) to be executed in combination with a computer, which is hardware, and stored in a medium included in a biopsy device.

The program may include code coded as a computer language, such as C, C++, Java, machine language, etc. which a processor (CPU) of the computer can read through a device interface of a computer. The code may include a functional code associated with a function that defines necessary functions for executing the methods, and may include an execution procedure-related control code in which the processor of the computer needs to execute the functions according to predetermined procedures. In addition, the code may further include additional information necessary for the processor of the computer to execute the functions or memory reference-related code for whether the media should be referenced in which location (address) of the internal or external memory of the computer. Moreover, if communication with any other computer or server in a remote location is required to execute the functions by the process of the computer, the code may further include communication-related code for how to communicate with any other computer or server at a remote location using the communication module of the computer, or whether or not any information or media should be transmitted and received in the communication.

The medium to be stored refers not to a medium storing data for a short time but to a medium that stores data semi-permanently, like a register, cache, memory, and the like, and means a medium readable by a device. In detail, as examples of the medium to be stored, there are read-only memories (ROMs), random access memories (RAMs), CD-ROMs, magnetic tapes, floppy disks, optical data storage devices, and the likes, but the present disclosure is not limited thereto. That is, the program can be stored in various recording media on a variety of servers that can be accessed by a computer or various recording media on the user's computer. Furthermore, the media can store code that is distributed to a computer system connected to the network and that is readable by the computer in a distributed fashion.

The biopsy method and the biopsy apparatus according to an embodiment of the present disclosure may determine in real time whether the amount of tissue acquired by FNA is sufficient to perform a biopsy. The biopsy method and the biopsy apparatus according to an embodiment of the present disclosure may determine through deep learning technology whether the amount of tissue acquired by FNA is sufficient to perform a biopsy.

The biopsy method and the biopsy apparatus according to an embodiment of the present disclosure can take a biopsy for the tissue acquired by FNA through deep learning technology.

The above description is only exemplary, and it will be understood by those skilled in the art that the disclosure may be embodied in other concrete forms without changing the technological scope and essential features. Therefore, the above-described embodiments should be considered only as examples in all aspects and not for purposes of limitation.

According to the present disclosure, it is possible to provide a method for examining cell and a device thereof, capable of determining in real time whether the amount of tissue acquired by FNA is sufficient for a biopsy.

According to the present disclosure, it is possible to provide a method for examining cell and a device thereof, capable of determining by deep learning technology whether the amount of tissue acquired by FNA is sufficient for a biopsy.

According to the present disclosure, it is possible to provide a method for examining cell and a device thereof, capable of performing a biopsy of the tissue acquired by FNA through deep learning technology.

The advantages of the present disclosure are not limited to the above-mentioned advantages, and other advantages, which are not specifically mentioned herein, will be clearly understood by those skilled in the art from the following description.

The invention claimed is:

1. A computer-implemented method comprising:
   obtaining image data of cells acquired from a region suspected to be a cancer lesion;
   determining that an amount of the cells acquired from the region is sufficient for performing a biopsy by processing the image data using a first image analysis model, wherein the first image analysis model is trained, using training data comprising various ratios of normal cell line and cancer cell line, to determine that an amount of cells is sufficient for performing a biopsy; and in response to determining that the amount of the cells acquired from the region is sufficient, determining that cancer-probable cells are included in the cells acquired from the region by processing the image data using a second image analysis model; and wherein the cells are acquired through Fine Needle Aspiration (FNA).

2. The method of claim 1, wherein determining that the amount of the cells is sufficient comprises:

calculating a number of cells with nuclei except for red blood cells; and determining that the amount of the cells is sufficient when the number is greater than or equal to a preset reference number.

3. The method of claim 1, wherein the cells include at least one of cancer-probable cells, inflammatory pancreatic parenchymal cells, normal gastric cells, and normal duodenal cells.

4. The method of claim 1, wherein determining that the cancer-probable cells are included in the cells comprises:

determining that the cancer-probable cells are included in the cells when the cells have at least one cancer-probable cell.

5. The method of claim 1, wherein determining that the amount of the cells is sufficient comprises analyzing the image data based on D-Rose.

6. The method of claim 1, further comprising:

obtaining second image data of cells from a second region suspected to be a cancer lesion;

determining that an amount of the cells acquired from the second region is insufficient for performing a biopsy by processing the second image data using the first image analysis model; and outputting a result indicating that the amount of the cells acquired from the second region is insufficient.

7. The method of claim 1, further comprising:

obtaining third image data of cells from a third region suspected to be a cancer lesion;

determining that an amount of the cells acquired from the third region is sufficient for performing a biopsy by processing the third image data using the first image analysis model;

in response to determining that the amount of the cells acquired from the third region is sufficient, determining that cancer-probable cells are not included in the cells acquired from the third region; and outputting a result indicating that cancer-probable cells are not included in the cells acquired from the third region.

8. The method of claim 1, wherein the first image analysis model is trained, using the training data comprising various numbers of cells to be smeared among cells arranged on a slide, to determine that an amount of cells is sufficient for performing a biopsy.

9. The method of claim 1, wherein determining whether the cancer-probable cells are included in the cells by processing the image data using the second image analysis model comprises:

determining the normal cell line;

determining the cancer cell line; and determining whether the cancer-probable cells are included in the cells using the normal cell line and the cancer cell line.

10. The method of claim 1, wherein the first image analysis model is a first deep learning model.

11. The method of claim 1, wherein the second image analysis model is a second deep learning model.

12. A system comprising one or more processing devices configured to:

obtain image data of cells acquired from a region suspected to be a cancer lesion;

determine that an amount of the cells acquired from the region is sufficient for performing a biopsy by processing the image data using a first image analysis model, wherein the first image analysis model is trained, using training data comprising various ratios of normal cell line and cancer cell line, to determine that an amount of cells is sufficient for performing a biopsy, and in response to determining that the amount of the cells acquired from the region is sufficient, determine that cancer-probable cells are included in the cells acquired from the region by processing the image data using a second image analysis model; and wherein the cells are acquired through Fine Needle Aspiration (FNA).

13. The system of claim 12, wherein determining that the amount of the cells is sufficient comprises:

calculating a number of cells with nuclei except for red blood cells; and determining that the amount of the cells is sufficient when the number is greater than or equal to a preset reference number.

14. The system of claim 12, wherein the cells include at least one of cancer-probable cells, inflammatory pancreatic parenchymal cells, normal gastric cells, and normal duodenal cells.

15. The system of claim 12, wherein determining that the cancer-probable cells are included in the cells comprises:

determining that that cancer-probable cells are included in the cells when the cells have at least one cancer-probable cell.

16. The system of claim 12, wherein determining that the amount of the cells is sufficient comprises analyzing the image data based on D-Rose.

17. The system of claim 12, wherein the one or more processing devices are configured to:

determine that the amount of the cells acquired from the region is insufficient; and output a result indicating that the amount of the cells acquired from the region is insufficient.

18. The system of claim 12, wherein the one or more processing devices are configured to:

determine that cancer-probable cells are not included in the cells acquired from the region; and output a result indicating that cancer-probable cells are not included in the cells acquired from the region.

19. A non-transitory, computer-readable medium storing one or more instructions executable by a computer system to perform operations comprising:

obtaining image data of cells acquired from a region suspected to be a cancer lesion, wherein the cells are acquired through Fine Needle Aspiration (FNA);

determining that an amount of the cells acquired from the region is sufficient for performing a biopsy by processing the image data using a first image analysis model, wherein the first image analysis model is trained, using training data comprising various ratios of normal cell line and cancer cell line, to determine that an amount of cells is sufficient for performing a biopsy; and in response to determining that the amount of the cells acquired from the region is sufficient, determining that cancer-probable cells are included in the cells acquired from the region by processing the image data using a second image analysis model.

20. The non-transitory, computer-readable medium of claim 19, wherein the first image analysis model is trained, using the training data comprising various numbers of cells to be smeared among cells arranged on a slide, to determine that an amount of cells is sufficient for performing a biopsy.

* * * * *